United States Patent [19]

Andrews

[11] 4,100,470

[45] Jul. 11, 1978

[54] PRECISION DRIVE SYSTEM FOR A CHART RECORDER

[75] Inventor: Elmer Andrews, Leonia, N.J.

[73] Assignee: Analytical Measurements, Inc., Chatham, N.J.

[21] Appl. No.: 701,995

[22] Filed: Jul. 1, 1976

[51] Int. Cl.² ............................................. H02P 3/00
[52] U.S. Cl. ..................................... 318/466; 346/136
[58] Field of Search .............. 318/162, 443, 444, 466, 318/468, 470, 484

[56] References Cited

U.S. PATENT DOCUMENTS

| | | | |
|---|---|---|---|
| 2,190,699 | 2/1940 | Cole | 318/162 X |
| 3,148,321 | 9/1964 | Holzer | 318/470 X |
| 3,641,412 | 2/1972 | Hayashi | 318/470 |
| 3,668,496 | 6/1972 | Markowitz et al. | 318/468 X |
| 3,881,144 | 4/1975 | Kikuchi | 318/466 |

Primary Examiner—Herman J. Hohauser
Attorney, Agent, or Firm—Burns, Doane, Swecker & Mathis

[57] ABSTRACT

A precision drive system for a chart recorder adapted to record time histories of one or more sensed parameters on a single chart including one power source, one or more sensing means adapted for electrical connection to said power source, a drive motor having a rotatable output shaft and adapted for electrical connection to the power source, a pulse generator operative in response to the power source to provide a pulse at selectable regular time intervals, a motor and sensor starting means operative in response to a pulse from the pulse generator for starting the motor and the sensing means at the regular time intervals, and a self interrupting means for the motor and the sensing means to turn the motor and the sensing means off after a reading has been recorded on said chart recorder, to provide a chart recorder which can operate in a remote location for long periods of time and give a precise time record independent of the power source voltage, with a low power consumption.

8 Claims, 3 Drawing Figures

PRECISION DRIVE SYSTEM FOR A CHART RECORDER

SUBJECT MATTER OF THE INVENTION

The present invention relates to a precision drive system for a chart recorder and more particularly for a battery operated chart recorder which provides a precise time record of one or more sensed parameters independent of battery voltage.

BACKGROUND OF THE INVENTION

In the past, chart recorders have been used for a variety of applications to provide an accurate time history of a particular measured parameter. Each reading is indicated by a mark on a moving chart driven by a constant speed motor. The time between readings is proportional to the distance between marks on the chart. Existing chart recorders provide an accurate time history by driving a constant speed motor with a readily available AC line voltage.

It is apparent, however, that there is often a need for a portable battery operated chart recorder that can provide a continuous time history of a measured parameter especially an environmental type parameter such as temperature, pH, conductivity, dissolved $O_2$ or turbidity of a body of water, or air pollutants at unattended field locations where AC line voltage may be unavailable.

A portable chart recorder may be driven by a mechanical drive including a spring wound motor with an escapement. In recorders of this kind, the chart motion is controlled by the escapement. However, as the spring runs down, the accuracy of the time record varies.

Existing portable battery operated chart recorders that use constant speed motors work well as long as the speed of the motor remains constant. However, for a battery operated device, maintaining a correct time readout has proved difficult and expensive because as the battery dissipates, the motor speed varies. This speed variance is particularly troublesome because it is cumulative. If each reading is off 1 minute every hour, at the end of a day the inaccuracy has grown to 24 minutes.

Speed controls such as governors can be used to regulate the speed of a DC motor but these devices are complicated and expensive and have the further disadvantage of consuming large amounts of current and therefore reducing battery life. Also in the past, voltage control circuits have been employed to deliver a constant voltage to the DC motor to provide a constant speed. However, experience has shown that it is very difficult to maintain a constant voltage from a DC battery. If the system is used in a field location, exposed to the elements, changes in temperature and other ambient parameters may have significant effects upon the voltage control circuits and the battery itself.

SUMMARY OF THE INVENTION

The present invention provides a chart recorder which can operate in a remote location for long periods of time using an electric power source of inconstant voltage output and still provide an accurate time history of one or more measured parameters even as the voltage is changed, e.g., after the batteries which are used as the power source begin to dissipate. The present invention provides a precise time record independent of battery voltage.

A pulse generator is used to close an electrical circuit at predetermined selectable time intervals. The circuit includes a DC motor, a DC power supply, a silicon controlled rectifier (S.C.R.), a microswitch, and one or more sensing means. The pulse generator turns on the S.C.R. and current flows from the DC power source through the S.C.R. to the motor and the sensing means. As the motor turns, a cam associated with the output shaft operates a microswitch connecting the power source directly to the motor and the sensing means. When the S.C.R. goes off the motor continues to rotate one revolution until the microswitch arm drops into a recess in the cam at which time the motor stops and the sensing means turns off. The sequence is repeated at the next pulse. Thus, the pulse generator turns the S.C.R. on at predetermined intervals to start the drive motor. The motor is on for a short period of time and then shuts off until the next pulse. Since the motor is only on for a short time while a measurement is being recorded, battery life is extended.

A further power saving can be achieved by turning the sensing apparatus on and off with the motor so that the electronic circuitry associated with the sensing apparatus is on only while a measurement is being recorded. This "battery saver" feature may significantly increase battery life because when measurements are taken only infrequently more power is consumed by the sensing circuitry when it is idle than by the chart motor when it is running.

Using a selectable pulse generator allows chart speed to be varied without the inconvenience of changing chart drive gears.

Furthermore, the use of a pulse generator allows the additional flexibility of monitoring several parameters together on a time shared basis, e.g., temperature, pH and battery voltage. Through the use of a multiplexing switch, associated with the pulse generator, each timing pulse activates a function selector switch, either mechanical or electronic, which in turn indexes the recorder stylus to a different sensor in a predetermined repeat sequence. Thus, as an example, the first pen strike will record temperature, the second pH, and the third, battery voltage. The fourth will return to temperature and the sequence will repeat. Timing will be such that a true record of the variation of each parameter with time will be displayed on the chart.

The invention has the further advantage that even as the battery runs down, accurate data can still be obtained because the time at which the measurement starts is known and is as accurate as the pulse generating means employed. In this way, temperature, pressure, pH or any other measurement can be taken at prescribed time intervals and an accurate time record of the variation of the measured parameter can be obtained.

The pulse generator may be a stable high frequency crystal oscillator associated with a switchable binary counter/divider circuit which emits a pulse every second, hour, day, etc. Alternatively, the pulse generator may be the hands of a clock associated with one or more contact points arranged around the circumference of the clock face to emit a pulse at desired intervals. In another alternative the pulse generator may be a stable R-C radio oscillator driving a series of binary counters to provide an output signal at desired intervals.

The microswitch and the cam may be replaced by a photo cell operated switch, a light source and a light sensitive surface on the shaft. A light absorbent surface is disposed on a portion of the circumference of the shaft. The remainder of the circumference is light reflective. The light source is reflected from the shaft surface into a photo cell to keep the motor turned on. When the light absorbent surface comes into alignment with the light source, the photo cell switch shuts the motor off. Alternatively the motor interruption may be controlled by a magnetic actuator.

For further understanding of the invention reference should be had to the following detailed description taken in conjunction with the accompanying drawings in which.

DETAILED DESCRIPTION OF THE INVENTION

Figure 1:
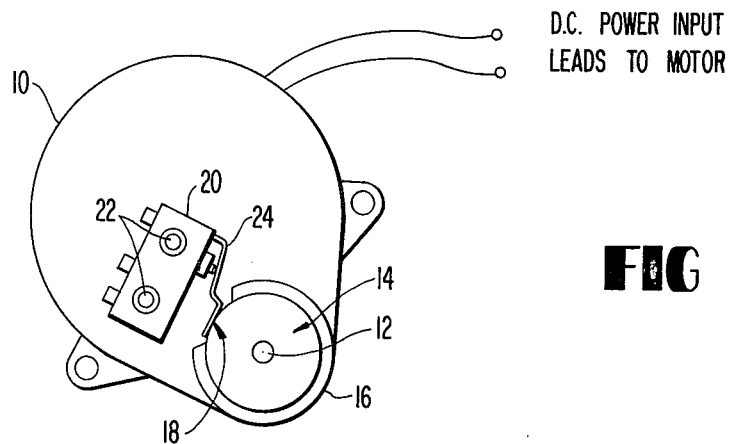
FIG. 1 is a plan view of a portion of the precision drive system of the present invention.

Referring now to FIG. 1 there is represented a DC motor 10 having an output shaft 12. An ordinary DC motor may be employed and not necessarily a precision motor. Associated with the motor is an integral gear train (not shown) to reduce the output shaft 12 speed to a low r.p.m., for example, approximately 3 r.p.m. A cam 14 is affixed to and rotatable with output shaft 12. The outer surface 16 of cam 14 is substantially concentric with the axis of output shaft 12 and includes an indented portion 18 along an arc of outer surface 16. DC motor 10 is driven by a DC power source (not shown). A microswitch 20 is affixed to the outside of motor 10 by means of bolts 22. Microswitch arm 24 is arranged to cooperate with cam surface 16 of cam 14. When the microswitch arm 24 drops into the indented portion 18 of cam surface 16 the microswitch shuts off and stops the motor.

Figure 2:
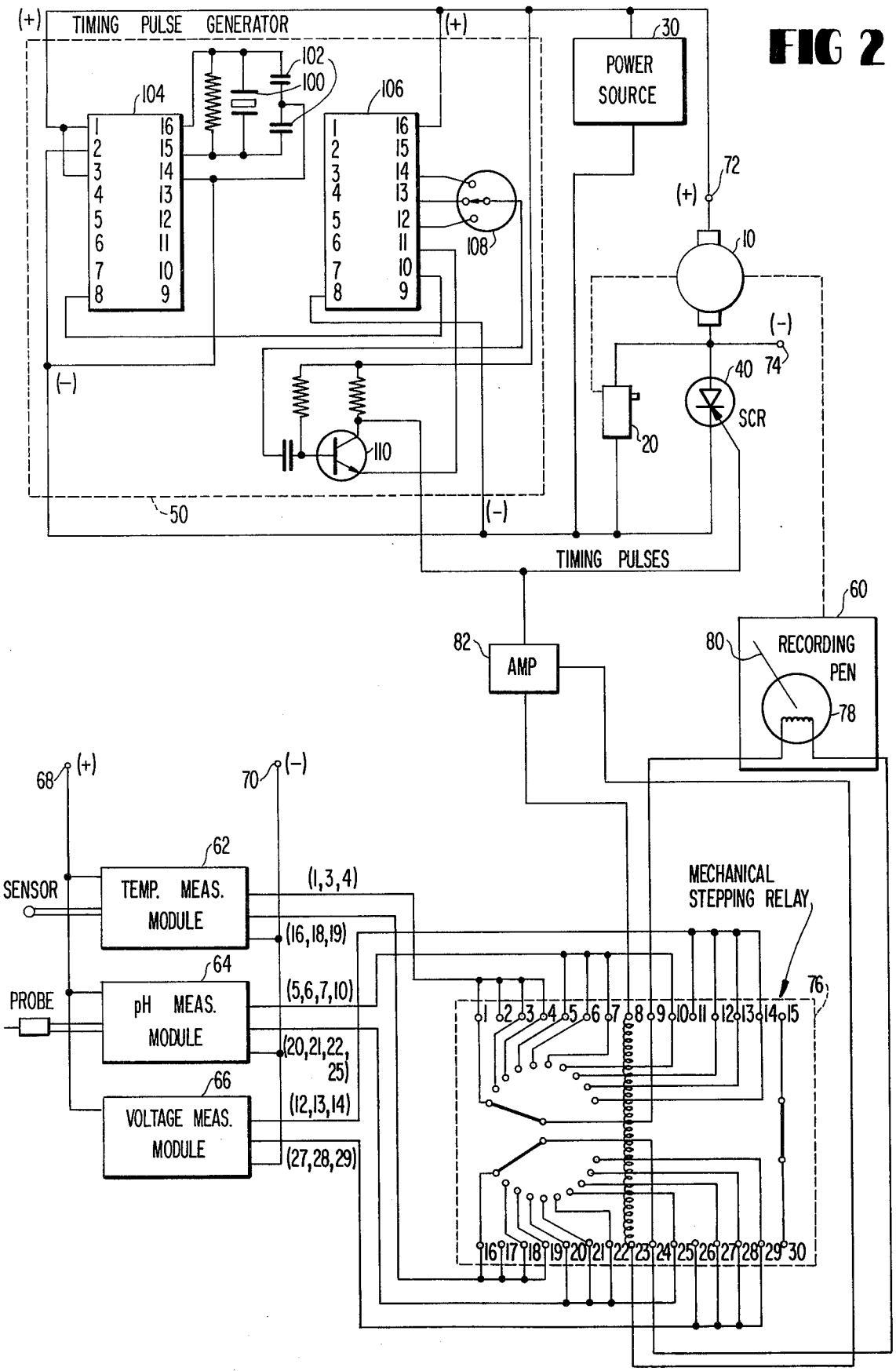
FIG. 2 is a schematic drawing of the electronic circuitry for the invention; and, FIG. 3 is a schematic drawing of the circuitry of an alternate embodiment of the system of FIG. 2.

Referring now to FIG. 2 there is shown a schematic of the electronic circuitry associated with the precision chart drive system of the present invention. DC motor 10 is connected in series with a battery power source 30 and microswitch 20. Connected in parallel across the microswitch is a silicon controlled rectifier (S.C.R.) 40. Pulse generator 50 is energized by power source 30 and emits a pulse at desired intervals to turn on S.C.R. 40. As will be explained, pulse generator 50 may be a high frequency quartz crystal oscillator associated with switchable binary counter/dividers to provide pulses at a variety of time intervals depending on the setting of the divider circuit.

When the pulse generator 50 turns on S.C.R. 40, current flows from the DC power source 30 through S.C.R. 40 to start the motor 10. As the motor turns, cam 14 associated with output shaft 12 (as shown in FIG. 1) operates microswitch 20 connecting the power source directly to the motor 10. When S.C.R. 40 turns "off" and motor 10 continues to rotate one revolution until microswitch arm 24 drops into recess 18 in the cam surface 16 (as shown in FIG. 1) at which time motor 10 stops. The sequence is repeated at the next pulse. The drive motor drives a standard chart recorder 60 of the kind available from Analytical Measurements, Inc., Chatham, New Jersey, to record the sensed parameters.

A plurality of sensing modules, for example, temperature sensor 62, pH sensor 64 and voltage sensor 66 are connected in parallel with each other and with motor 10 so that the sensor circuitry will be energized when the motor is on and deenergized when the motor is off. This provides a further battery saving feature. In FIG. 2 contact points 68 and 70 are connected respectively to contact points 72 and 74. Sensors 62, 64 and 66 are also connected to a function selector switch which may be a 2 × 10 contacts mechanical stepping relay 76 of the kind available from Schrack Company of New York City, New York. In the embodiment shown in FIG. 2 which employs only three sensors, temperature sensor 62 is connected to contact points 1, 3, 4 and 16, 18, 19 of relay 76. PH sensor 64 is connected to contact points 5, 6, 7, 10 and 20, 21, 22, 25. Voltage sensor 66 is connected to contact points 12, 13, 14 and 27, 28, 29. Contact points 9 and 24 of relay 76 are connected to a galvanometric type stylus index 78 of recording pen 80 on chart recorder 60.

Each time pulse generator 50 emits a pulse, in addition to triggering S.C.R. 40, it also activates relay 76 to connect the recorder pen 80 first to measure one parameter then another and another until relay 76 has advanced through all its steps. Amplifier 82 amplifies the pulse signal to operate relay 76. It will then repeat the sequence. The output of up to ten sensing modules may be connected to recorder pen 80 in sequence, thus permitting the monitoring of up to 10 parameters on a single chart. If less than 10 parameters are being recorded, as in the embodiment of FIG. 2 several contacts may be paralleled to produce a greater number of data points for that particular parameter. Each sensing module is provided with "set point" adjustment so that its "normal" point on the chart will be apparent and the data points will not overlap. Thus several parameter histories may be multiplexed onto a single chart and can easily be analyzed separately or in relationship to each other.

Pulse generator 50 includes high frequency quartz crystal oscillator 100 and its associated trimmer capacitors 102 are adapted for electrical connection to a digital counter 104 which may be a digital integrated circuit CD 4045 sold by RCA as shown in the RCA COS/MOS SSD2036 Manual, File No. 614. A binary counter/divider 106, CD 4020 sold by RCA (ibid, File No, 479) is used to provide a selectable pulse rate. The pulse rate may be chosen simply by varying switch 108. High impedance power transistor 110 is used to amplify the pulse for transmission to the S.C.R.

Figure 3:
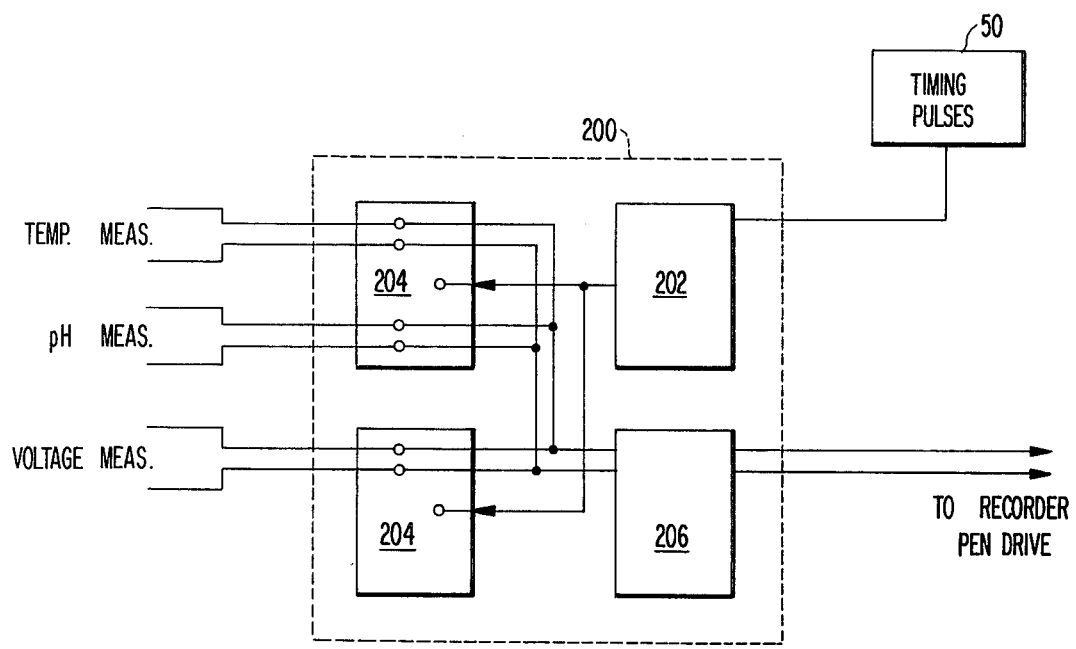

Referring now to FIG. 3 there is shown an electronic function selector switch 200 which may be used in place of stepping relay 76 in FIG. 2. The pulse from pulse generator 50 activates electronic function selector switch 200 which includes a counter/divider circuit 202, CD 4022 sold by RCA as shown in the RCA COS/MOS SSD2036 Manual, File No. 479, and two QUAD bilateral switches 204, CD 4066 sold by RCA as shown in the RCA COS/MOS SSD2036 Manual, File No. 769. Switch 200 acts electronically to connect each sensor in sequence to recorder pen 80. Amplifier 206 is provided to amplify the sensor signal transmitted to pen 80.

The operation of the invention may be better understood by the following examples. In a preferred embodiment, the present invention uses a 9½ volt DC battery as a power source 30. A stable high frequency quartz crystal oscillator is used to drive a binary counter/divider to emit a pulse every 30 seconds. DC motor 10 is designed to operate through its integral gear train to drive its output shaft at approximately 3 r.p.m. and to draw about 20 m.a. current. With a pulse emitted every thirty seconds, the average motor speed will be 2 r.p.m. with a degree of accuracy equal to that of the pulse generator. Instantaneous motor speed will vary from approximately 3 r.p.m. when the motor is running to 0 r.p.m. when the motor is off. The average speed, however, will be 2 r.p.m. Average motor speed is independent of battery voltage, ambient temperature and exact value of circuit parameters. The pulse was also used to index a stepper relay to connect the recording pen to a temperature, pH and voltage sensor in sequence. This drive system was used in conjunction with a standard Analytical Measurements, Inc. chart recorder to record the temperature and pH variations of a bath of water and battery voltage and accurate data was obtained.

A 4 r.p.m. motor pulsed once per minute will run for 15 seconds to complete one revolution and stop after the microswitch 20 drops into recess 18 in cam 14. After a pause of 45 seconds, the next minute pulse will initiate another cycle.

If a pulse rate of 30 seconds is selected the motor will run for the same time but the pause will be only 15 seconds and therefore the chart paper will run at twice the speed.

With the same selector switch, a binary count of 2 minutes can be chosen so that the chart paper speed will be ½ of the first step described above because the motor will run for 15 seconds to be off for 105 seconds.

Similarly any binary count can be conveniently selected at several minute intervals to further reduce chart speed and also save more battery power. In this way chart speed may be varied from ⅛ inch per hour to 4 inches per hour. This achieves a 32 to 1 chart speed ratio variation in 6 switchable steps using only the pulse rate selecting mechanism of pulse generator 50. There is no need to change gear trains for the motor or the chart drive.

It has been found that the chart drive system of the present invention will operate satisfactorily even after the battery runs down to as low as 1 volt. Battery life is extended appreciably.

From the foregoing it can be seen that the present invention provides a simple and effective means for driving a portable battery operated chart recorder to provide a precise time record independent of battery voltage. Battery life is extended because the motor and the sensing apparatus are on for only a short period of time in order to take the measurement and then shut off. The invention has the further advantage that even as the battery runs down accurate data can still be obtained because the time at which the measurement is initiated is known.

While in the foregoing there has been described and shown one of the preferred embodiments of the invention, various modifications may become apparent to those skilled in the art to which the invention relates without departing from the scope of the invention. Accordingly, the invention is not to be limited except as in the appended claims.

What is claimed is:

1. A precision chart drive system for a chart recorder comprising:
   a power source;
   a drive motor for driving said chart recorder and having a rotatable output shaft and adapted for electrical connection to said power source;
   a pulse generator operative in response to said power source to provide a pulse at regular time intervals including;
   an oscillator;
   means responsive to said oscillator for providing a pulse at regular time intervals;
   means for differentiating said pulse to provide a spike pulse;
   means for amplifying said spike pulse to provide a trigger pulse;
   means associated with said pulse generator for selectably varying said pulse rate to provide a selectably variable chart recorder drive speed;
   a motor starting means operative in response to said trigger pulse for starting said motor at said regular time intervals;
   switching means operative in response to said initial motor motion for connecting said motor directly to said power source; and,
   self interrupting means for said motor to turn said motor off after a predetermined angular rotation of said shaft.

2. The apparatus of claim 1 wherein said interrupting means includes:
   means for generating a signal representative of output shaft rotation; and,
   switching means operative in response to said signal generating means for turning off said motor.

3. The apparatus of claim 2 wherein said signal generating means includes a cam affixed to and rotatable with said motor output shaft and having a predetermined cam surface for generating a signal representative of said shaft rotation and wherein said switching means includes a microswitch operated by said cam surface.

4. The apparatus of claim 1 wherein said power source includes a DC battery; and
   said motor is a non-precision DC motor.

5. The apparatus of claim 1 wherein said pulse generator includes:
   a stable high frequency crystal oscillator; and,
   a selectable binary counter/divider adapted to receive said crystal oscillation signal and to emit a pulse at regular time intervals.

6. The apparatus of claim 1 wherein said pulse generator includes:
   a clock mechanism;
   a clock hand operated by said mechanism; and,
   one or more electrical contact points disposed in the path of said hand for generating a pulse each time said hand touches one of said contact points.

7. The apparatus of claim 1 wherein said pulse generator includes:
   a stable R-C audio oscillator; and,
   a series of binary counters adapted to receive said R-C audio oscillator signal and to emit a pulse at regular time intervals.

8. The apparatus of claim 1 wherein said starting means includes a silicon controlled rectifier.

* * * * *